US008760687B2

(12) United States Patent
Son et al.

(10) Patent No.: US 8,760,687 B2
(45) Date of Patent: Jun. 24, 2014

(54) IMAGE FORMING APPARATUS AND DOCUMENT MANAGEMENT METHOD THEREOF

(75) Inventors: Hwa-jeong Son, Suwon-si (KR); Sang-hyup Lee, Suwon-si (KR)

(73) Assignee: SAMSUNG Electronics Co., Ltd., Suwon-si (KR)

( * ) Notice: Subject to any disclaimer, the term of this patent is extended or adjusted under 35 U.S.C. 154(b) by 899 days.

(21) Appl. No.: 12/821,313

(22) Filed: Jun. 23, 2010

(65) Prior Publication Data

US 2011/0085198 A1     Apr. 14, 2011

(30) Foreign Application Priority Data

Oct. 13, 2009    (KR) .......................... 10-2009-0097251

(51) Int. Cl.
     *G06F 3/12*         (2006.01)
     *H04N 1/00*        (2006.01)

(52) U.S. Cl.
     USPC ........... 358/1.15; 358/403; 358/448; 358/1.6; 382/182; 382/181; 235/462.25

(58) Field of Classification Search
     None
     See application file for complete search history.

(56) References Cited

U.S. PATENT DOCUMENTS

| | | | | | |
|---|---|---|---|---|---|
| 5,420,943 | A | * | 5/1995 | Mak ............................... | 382/313 |
| 5,467,433 | A | * | 11/1995 | Lamprecht et al. .......... | 358/1.15 |
| 5,734,839 | A | * | 3/1998 | Enoki et al. ..................... | 705/20 |
| 5,767,497 | A | * | 6/1998 | Lei ........................... | 235/462.12 |
| 5,880,451 | A | * | 3/1999 | Smith et al. ................. | 235/462.1 |
| 5,946,414 | A | * | 8/1999 | Cass et al. ..................... | 382/183 |
| 6,540,143 | B1 | * | 4/2003 | Matsumori .............. | 235/462.13 |
| 6,976,630 | B2 | * | 12/2005 | Miyazawa et al. ....... | 235/462.25 |
| 7,446,892 | B1 | * | 11/2008 | Churchill et al. ............ | 358/1.15 |
| 8,014,039 | B2 | * | 9/2011 | Nohtomi ....................... | 358/403 |
| 8,181,868 | B2 | * | 5/2012 | Thomas et al. ............... | 235/384 |
| 2008/0019615 | A1 | * | 1/2008 | Schnee et al. ................. | 382/313 |
| 2008/6291471 | | * | 11/2008 | Uchida, Yuki ................ | 358/1.6 |
| 2010/0230493 | A1 | * | 9/2010 | Akiyama ..................... | 235/437 |

FOREIGN PATENT DOCUMENTS

| | | |
|---|---|---|
| JP | 1995-143308 | 6/1995 |
| JP | 2000511320 | 8/2000 |
| JP | 2008131189 | 6/2008 |

OTHER PUBLICATIONS

Korean Office Action dated Mar. 26, 2014 issued in KR Application No. 10-2009-0097251.

* cited by examiner

*Primary Examiner* — Ashish K Thomas
(74) *Attorney, Agent, or Firm* — Stanzione & Kim, LLP (57) ABSTRACT

An image forming apparatus and a document management method thereof. A document management method of an image forming apparatus which includes an image scanner to scan a document and generate a scanned image, the method includes generating the scanned image by scanning a document including a bar code, determining whether to perform an optical character recognition (OCR) on the scanned image by using bar code information of the generated scanned image, extracting character information of the document by performing the OCR with respect to the scanned image according to the determination result, and setting a file name by using at least one of the bar code information and the extracted character information and storing the scanned image. The apparatus and method set a file name of a scanned document to identify the document without an additional input.

18 Claims, 9 Drawing Sheets

IMAGE FORMING APPARATUS AND DOCUMENT MANAGEMENT METHOD THEREOF

CROSS-REFERENCE TO RELATED APPLICATIONS

This application claims priority under 35 U.S.C. §119(a) from Korean Patent Application No. 10-2009-0097251, filed on Oct. 13, 2009, in the Korean Intellectual Property Office, the disclosure of which is incorporated herein in its entirety by reference.

BACKGROUND

1. Field of the Invention

Apparatuses and methods the present general inventive concept relate to an image forming apparatus and a document management method thereof, and more particularly, to an image forming apparatus and a document management method thereof to set a file name of a scanned document by using bar code information of the scanned document.

2. Description of the Related Art

An image forming apparatus forms an image on a document. The image forming apparatus may include a printer, a photocopier, a facsimile, a multi-function device which has at least two functions, etc.

Recently, demand for an image forming apparatus as an office automation device performing not only a document print function but also a scanning function and a faxing function has increased. Accordingly, image forming apparatuses have been developed to extend functions with high performance.

In line with rapid development of hardware of the image forming apparatus, software automation technology has become various to provide more convenience to a user.

The need for development of an electronic document management system (EDMS) solution has increased to efficiently manage documents in large volume and keep them safe.

A conventional image forming apparatus stores a scanned document in a preset file name, e.g., "Untitled.pdf", "Untitled001.pdf.", etc.

If several documents are scanned at a time, a user should open each document to identify the contents or the scanned documents after the scanning is completed.

Further, the conventional image forming apparatus uniformly stores the scanned documents in a preset location and a user should separately set a directory for each scanned document or should individually move the prestored scanned document to a desired directory to efficiently manage the documents.

SUMMARY

Accordingly, exemplary embodiments of the present general inventive concept provide an image forming apparatus and a document management method thereof to set a file name of a scanned document by using bar code information of the document, or character information such as keywords, so that a user can easily identify the document without an additional input of a file name or an amendment.

Exemplary embodiments of the present general inventive concept provide an image forming apparatus and a document management method thereof which generates a directory corresponding to a category categorized by a predetermined standard and stores a scanned document in the generated directory to provide convenience in a document management.

Additional features and/or utilities of the present general inventive concept will be set forth in part in the description which follows and, in part, will be obvious from the description, or may be learned by practice of the present general inventive concept.

Exemplary embodiments of the present general inventive concept may provide a document management method of an image forming apparatus which includes an image scanner to scan a document and generate a scanned image, the method including generating the scanned image by scanning a document including a bar code, determining whether to perform an optical character recognition (OCR) on the scanned image by using bar code information of the generated scanned image, extracting character information of the document by performing the OCR on the scanned image according to the determination result, and setting a file name with at least one of the bar code information and the extracted character information and storing the scanned image.

The determining whether to perform the OCR may include determining whether the bar code includes a 1-D bar code or a 2-D barcode, and performing the OCR when the bar code includes a 1-D bar code according to the determination result.

The determining whether to perform the OCR may include reading the bar code information and determining whether the read bar code information includes information to set the file name and performing the OCR when the bar code information is insufficient according to the determination result.

The storing the scanned image includes storing the scanned image in a designated directory according to at least one of the bar code information and the extracted character information.

The storing the scanned image may include generating at least one directory corresponding to a category categorized by at least one of the bar code information and the extracted character information, and storing the scanned image in the generated directory, where the file name includes the generated directory information.

The method may further include comparing at least one of the bar code information and the extracted character information with document information database (DB), where the storing the scanned image may include setting the file name according to the comparison result.

The document information DB may include file name information categorized by at least one category.

The method may further include extracting a bar code image of the generated scanned image, and adjusting the bar code image by performing at least one of a binarization, a deskewing process and a smoothing process one of the extracted bar code image.

The method may further include extracting character information from the adjusted bar code image, and reading the bar code image by decoding the extracted character information.

The method may further include searching for a document similar to the scanned document by using at least one of the bar code information and the extracted character information, and displaying the search result.

The method may further include receiving a bar code type and document information from a user according to a print command, converting the document information into a bar code as the input bar code type, and printing a document including the converted bar code.

Exemplary embodiments of the present general inventive concept can also provide an image forming apparatus, including an image scanner to scan a document including a bar code and to generate the scanned image, a storage unit to store therein the scanned image, and a controller to determine whether to perform an optical character recognition (OCR) on the scanned image by using bar code information of the generated scanned image, to extract character information of the document by performing the OCR on the scanned image according to the determination result, to set a file name by using at least one of the bar code information and the extracted character information, and stores the generated scanned image in the storage unit.

The controller may determine whether the bar code includes a 1-D bar code or a multidimensional bar code, and performs the OCR when the bar code includes the 1-D bar code according to the determination result.

The controller may read the bar code information and determine whether the read bar code information includes information to set the file name, and perform the OCR when the bar code information is not sufficient according to the determination result.

The controller may store the scanned image in a designated directory according to at least one of the bar code information and the extracted character information.

The controller may generate at least one directory corresponding to a category categorized by at least one of the bar code information and the extracted character information, and store the scanned image in the generated directory, and the file name includes the generated directory information.

The storage unit may include a document information database (DB) to store at least one of the bar code information and the extracted character information, and the controller may compare at least one of the bar code information and the extracted character information with the document information DB and set the file name according to the comparison result, and the document information DB may include file name information categorized by at least one category.

The controller may extract a bar code image of the generated scanned image, adjust the bar code image by performing at least one of a binarization, a deskewing process and a smoothing process on the extracted bar code image, extract character information from the adjusted bar code image and read the bar code information by decoding the extracted character information.

The image forming apparatus may further include a display unit, where the controller may search a document similar to the scanned document by using at least one of the bar code information and the extracted character information, and control the display unit to display thereon the search result.

The image forming apparatus may further include an image forming unit to perform a print operation according to a print command, and a user input unit to receive the print command, a bar code type and document information from a user, where the controller may convert the document information into a bar code as the input bar code type, and control the image forming unit to print a document including the converted bar code.

Exemplary embodiments of the present general inventive concept may also provide a method of managing documents, the method including scanning a document having a bar code with an image forming apparatus, extracting character information of the scanned document with the image forming apparatus, generating a file name with at least one of information of the scanned bar code and the extracted character information, and storing the scanned image in a storage unit.

The method may also include determining a directory to store the scanned image in the storage unit according to at least one of the scanned bar code information and the extracted character information, and storing the scanned image in the determined directory in the storage unit.

The method may also include storing the scanned document in the storage unit according to the at least one of the information of the scanned bar code and the extracted character information, and a category of a document information database.

Exemplary embodiments of the present general inventive concept may also provide a method of printing a document onto a printing media with an image forming apparatus, the method including receiving a print command to print the document with the image forming apparatus, receiving a bar code type and document information of the document with the image forming apparatus, generating a bar code with the received document information according to the received bar code type, and printing the document with the generated bar code in a predetermined location on the printing media.

BRIEF DESCRIPTION OF THE DRAWINGS

The above and/or other features and utilities of the present general inventive concept will become apparent and more readily appreciated from the following description of the embodiments, taken in conjunction with the accompanying drawings of which

DETAILED DESCRIPTION OF THE EMBODIMENTS

Figure 1:
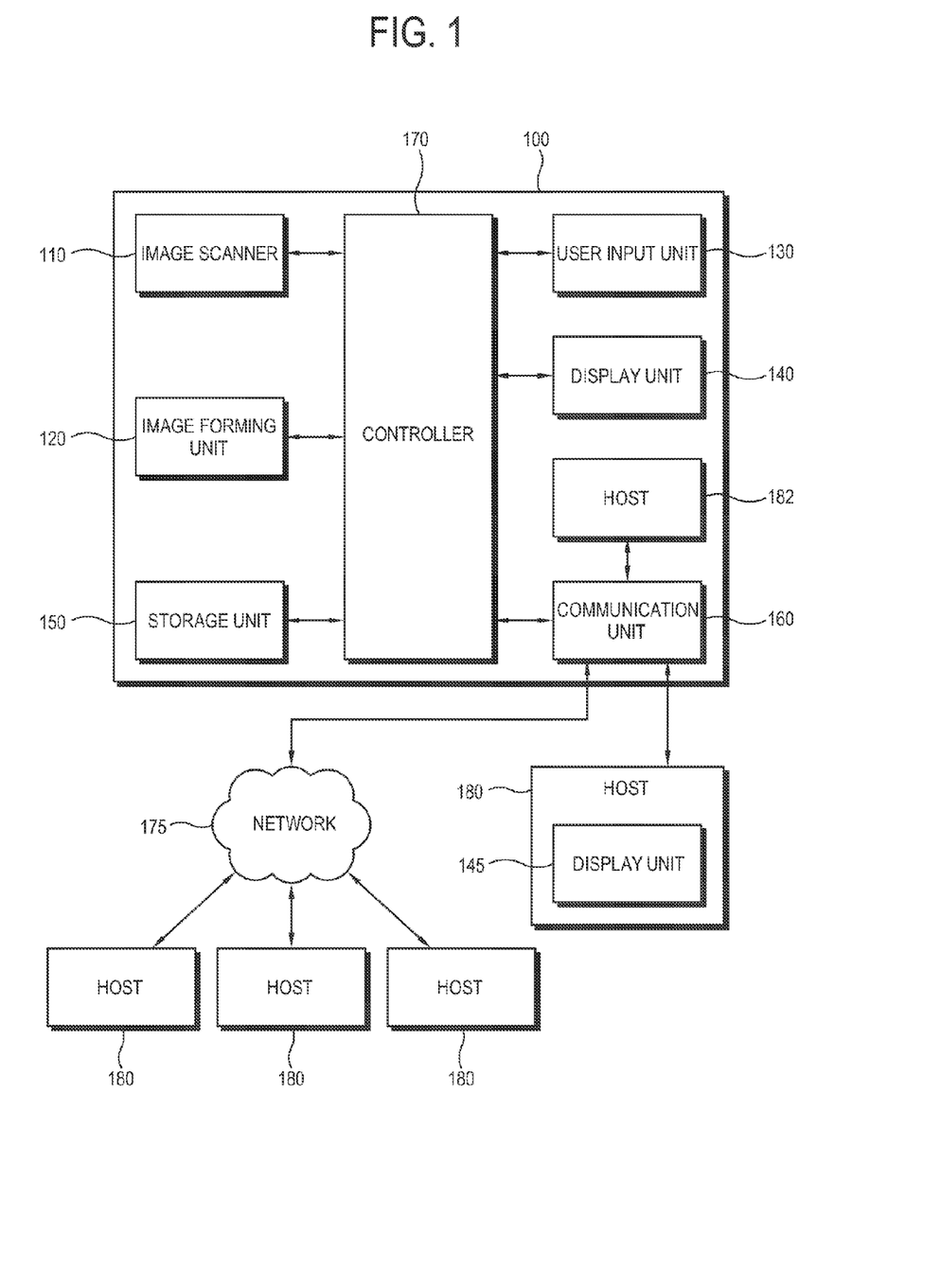
FIG. 1 is a block diagram illustrating an image forming apparatus according to exemplary embodiments of the present general inventive concept.

Hereinafter, exemplary embodiments of the present general inventive concept will be described with reference to accompanying drawings, wherein like numerals refer to like elements and repetitive descriptions will be avoided as necessary FIG. 1 is a block diagram illustrating an image forming apparatus 100 according to exemplary embodiments of the present general inventive concept. The image forming apparatus 100 according to the present general inventive concept may include a printer, a photocopier, a scanner, a facsimile or a multi-function device to provide at least two functions (e.g., printing, scanning, copying, faxing, etc.).

The image forming apparatus 100 according to the present general inventive concept may scan an image from a document including a bar code to generate a scanned image, and may store the generated scanned image in a file name corresponding to bar code information.

As illustrated therein, the image forming apparatus 100 according to exemplary embodiments of the present general inventive concept includes an image scanner 110, an image forming unit 120, a user input unit 130, a display unit 140, a storage unit 150, a communication unit 160 and a controller 170.

The image scanner 110 can scan a document and generate a scanned image. The document can include a general document, a photo, a film, etc. The image scanner 110 may include a scan unit to scan a document and to generate an image.

The scanned image which is generated by the image scanner 110 may be converted into a fax signal and transmitted to the outside by the communication unit 160 (as described below).

The image scanner 110 according to the present general inventive concept can scan a document including a bar code, and can generate a scanned image including a bar code image in a predetermined area.

The generated scanned image may be stored in a predetermined and/or preset directory with a file name according to bar code information decoded by image extracting, image adjusting, information extracting and bar code information reading processes (as described in detail below).

The image forming unit 120 can form an image on at least one image forming media (e.g., a sheet of paper or any other suitable print media to carry out the exemplary embodiments of the present general inventive concept as described herein) according to print data and can perform a print operation according to a print command. The print operation can include a print operation for received fax data, a print operation to copy a scanned document, and a print operation for print data received from the outside through a host device 180 that may include a server or print data stored in an inside host device 182 (e.g., hard disk drive, solid state drive, etc.), or host device 180 that is outside (USB memory stick or other suitable memory device) of the image forming apparatus 100. As illustrated in FIG. 1, a host device 180 may be communicatively coupled to the communication unit 160. A host 180 may also communicatively coupled to the communication unit 160 via a communications network 175, which may be any suitable wired and/or wireless communication network. Host device 180 may be a computer, a server, a handheld computing device, a personal digital assistant, a smartphone, a processor, a digital storage device, or any suitable device to carry out the exemplary embodiments of the present general inventive concept as disclosed herein. As illustrated in FIG. 1, host device 182 may be disposed within the image forming apparatus 100 and communicatively coupled to the communication unit 160.

The image forming unit 120 according to the present general inventive concept may print a document including a predetermined bar code corresponding to document information.

Figure 2:
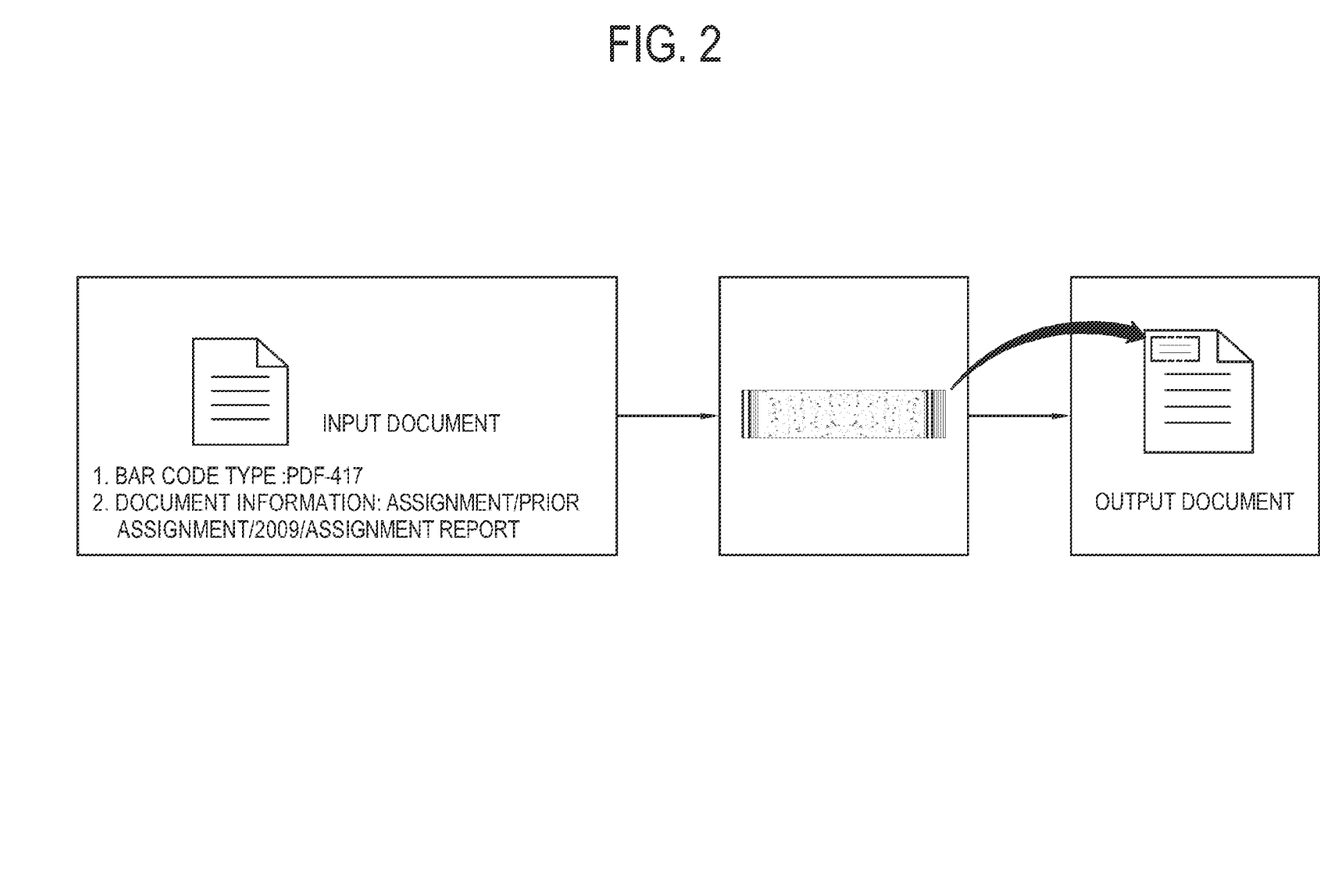
FIG. 2 illustrates an output process of a document including a bar code according to exemplary embodiments of the present general inventive concept.

FIG. 2 illustrates an output process of a document including a bar code according to exemplary embodiments of the present general inventive concept.

As illustrated therein, the image forming apparatus 100 according to the present general inventive concept may receive a bar code type and document information included in the bar code from a user according to a document printing command, and output a document with the bar code including the input document information.

The bar code type can include a 1-D bar code and multidimensional bar code including at least 2-D bar code. Hereinafter, the 2-D bar code will be described as an example of the multidimensional bar code.

The 1-D bar code can include characters and numbers by a combination of black bars in different thickness and empty space. The 1-D bar code is decoded by absorption and reflection of light, and may include a standard type, GS1-13, and S1-14 code, and GS1-128 code.

The 2-D bar code may include increased information in a smaller space than the 1-D bar code. Graphic, photo, audio, fingerprint, and signatures, as well as characters and numbers, may be stored in the 2-D bar code. The 2-D bar code may minimize and/or prevent forgery with encoding and video compression. The 2-D bar code includes QR code, PDF417, Datamatrix, Maxicode, etc.

FIG. 2 illustrates PDF417 as an example 2-D bar code.

A user may input document information included in the bar code according to a selected bar code type. For example, the user input unit 130 of the image forming apparatus 100 may receive document information to be included in the bar code. Alternatively, the host device 180 and/or the host device 182 may receive and/or store the document information to be included in the bar code.

Referring to FIG. 2, if a user inputs "assignment/prior assignment/2009/assignment report" as document information for a document to be printed, the controller 170 may convert, i.e., encode the input document information into a PDF417 bar code, and control the image forming unit 120 to print a document having the converted bar code in a predetermined location, i.e., in an upper left side. That is, the received user input for the user input unit 130 of the host devices 180 and/or 182 may be used by the controller 170 to encode the received input document information into a predetermined bar code, and control the image forming unit 120 to print a document with the bar code in a predetermined location on the printing medium.

The encoding module to encode the bar code may be stored (e.g., stored in advance before the encoding, etc.) in the storage unit 150. Alternatively, the encoding module may be stored in the host device 182 or in one or more of the host devices 180.

If the printed document is scanned by the image scanner 110 (e.g., scanned in the future), the file name of the scanned image can be selected (e.g., automatically selected) and stored by using at least a portion of the printed bar code.

The user input unit 130 can receive a user's command. The user input unit 130 may include at least one input button provided in the image forming apparatus 100 (hereinafter, to be also called "hard key") and/or a graphic user interface (hereinafter, to be also called "GUI") which is generated by an execution of an application (e.g., an application stored in the storage unit 150) and displayed on the display unit 140 to receive an input from a user by, for example, a user's touch. That is, the user input unit can receive input via a selection of at least one hard key and/or receive at least one selection in a GUI of the user input unit 130.

A user may perform a log-in process to input an ID (i.e., identification name) and a password that can be assigned to each user account through, for example, the user input unit 130. The log-in can include an administrator log-in to set and/or change one or more of the environments of the image forming apparatus 100 is available without an additional access limit. If a user log-in or an administrator log-in is performed, the image forming apparatus 100 identifies and permits a user. According to the present general inventive concept, a user includes an administrator.

The display unit 140 may display thereon a setting and operation status of the image forming apparatus 100, and may display a UI (user interface) screen to receive one or more commands from a user. The display unit 140 may include a thin film transistor—liquid crystal display (TFT-LCD), a driver (not illustrated) to drive the TFT-LCD, and a touch panel (hereinafter, to be also called "touch screen" or "touch pad") to recognize a user's touch. The display unit 140 may be any suitable display to display the UI and receive input from the user to carry out the exemplary embodiments of the present general inventive concept as disclosed herein.

In the image forming apparatus 100 according to the present general inventive concept, the user input unit 130 may include an icon to be selected by a user through a touch panel of the display unit 140. That is, the user input unit 130 may receive a selection of at least one icon. The user input unit 130 and the display unit 140 may be provided as a single unit rather than separate units.

In the image forming apparatus 100 according to the present general inventive concept, the single configuration of the user input unit 130 and the display unit 140 is also called an operation panel.

The display unit 140 may include a first display unit provided in the image forming apparatus 100 and a second display unit provided in a host apparatus (e.g., as illustrated in FIG. 1, host device 180 may include a display unit 145) connected to the image forming apparatus 100 by the communication unit 160.

If the display unit 140 includes the second display unit (e.g., display unit 145), a UI can be displayed on the second display unit (e.g., display unit 145) to be selected as the user input unit 130 can include a remote user interface (RUI). A user's command can be received from the host device 180 and/or host device 182 connected to the image forming apparatus 100 through the communication unit 160.

The image forming apparatus 100 according to the present general inventive concept may receive document information through, for example, a virtual keyboard displayed on the touch screen of the user input unit 130, or receive print data including document information or additional document information from the host device 180 and/or host device 182.

The storage unit 150 can include at least one document information database (DB).

Figure 3:
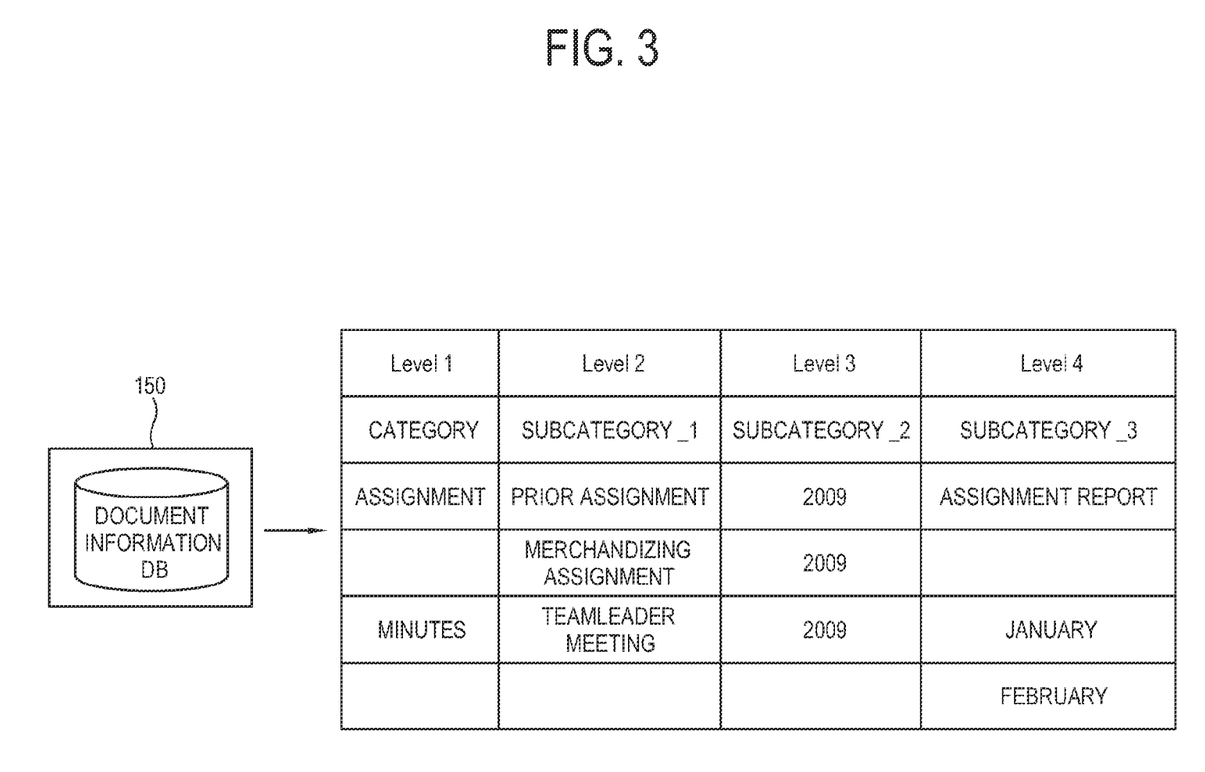
FIG. 3 illustrates a document information database according to exemplary embodiments of the present general inventive concept.

FIG. 3 illustrates document information DB according to the exemplary embodiments of the present general inventive concept.

As illustrated therein, the document information DB includes a document information list which is a basis for setting a file name.

More specifically, the document information DB can include file name information corresponding to at least one category (for example, category, subcategory_1, subcategory_2, subcategory_3, etc.) categorized according to a level (e.g., a predetermined level, one or more preselected levels, etc.).

A user may input document information on a document to be printed by referring to the document information list of the DB. The controller 170 can control the image forming unit 130 to print a document including a bar code corresponding to the input document information.

The controller 150 may read bar code information by using a scanned bar code image generated from the scanned document including the bar code, compare the read bar code information with the document information DB (e.g., compare the category information and/or level information of the read bar code with the category information in the document information DB, etc.), and select the file name according to the comparison result to store the scanned document (e.g., store the scanned document in the storage unit 150).

The storage unit 150 may store therein print data for a print operation, fax data for a fax transmission, image data scanned by the image scanner 110, data received from the outside connected through the communication unit 160, setting information of the image forming apparatus 100 through the user input unit 130, user registration information set for each user account, user certification information, usage authorization information, etc.

The storage unit 150 can include an internal storage medium such as an HDD (hard disk drive), solid state drive, and/or an external or portable storage medium such as a USB memory, a memory card (memory stick, CF card, and a MMC), and a memory card slot. Alternatively, one or more of the host devices 180 and/or the host device 182 may store print data for a print operation, fax data for a fax transmission, image data scanned by the image scanner 110, data received from the outside connected through the communication unit 160, setting information of the image forming apparatus 100 through the user input unit 130, user registration information set for each user account, user certification information, usage authorization information, etc.

The communication unit 160 can perform a data communication with a host apparatus (e.g., host device 180 and/or host device 182) or the outside including a server connected in a wired/wireless network (e.g., at least one host device 180 communicatively coupled to the network 175), and can receive print data in a predetermined print language, protocol, and/or format from the outside.

The communication unit 160 may include a wired/wireless network communication module which is connected with an external device such as a host apparatus (e.g., host device 180) by a local connection or in a network (e.g., via the network 175) by a predetermined protocol, or an interface (e.g., USB port) connected to a portable storage medium such as a USB memory or an interface which is connected to the storage device 150.

The communication unit 160 may include a fax communication module (e.g., modem) which can convert image data generated by the image scanner 110 into a fax signal and can transmit the fax signal to an external fax machine (including a multi-function device having a fax function) by using a public switched telephone network (PSTN) or the fax communication module can receive a fax signal from the outside.

The communication unit 160 may perform a scan to host function or a scan to server function to transmit a scanned image to a host apparatus or an external apparatus such as a server (e.g., to transmit the scanned image to the host device 180) or perform a scan to email function to transmit a scanned image to the outside (e.g., to at least one host device 180).

The data which are received from the outside (e.g., from the host 180 and/or from the network 175) through the communication unit 160 (including fax data) can be stored in the storage unit 150.

The controller 170 can control the image forming apparatus 100 at least in part.

More specifically, if a scan command is received through the user input unit 130 to scan a document including a bar code, the controller 170 can control the image scanner 110 to scan the document and generate a scanned image, and can store the generated scanned image in the storage unit 150.

Figure 4:
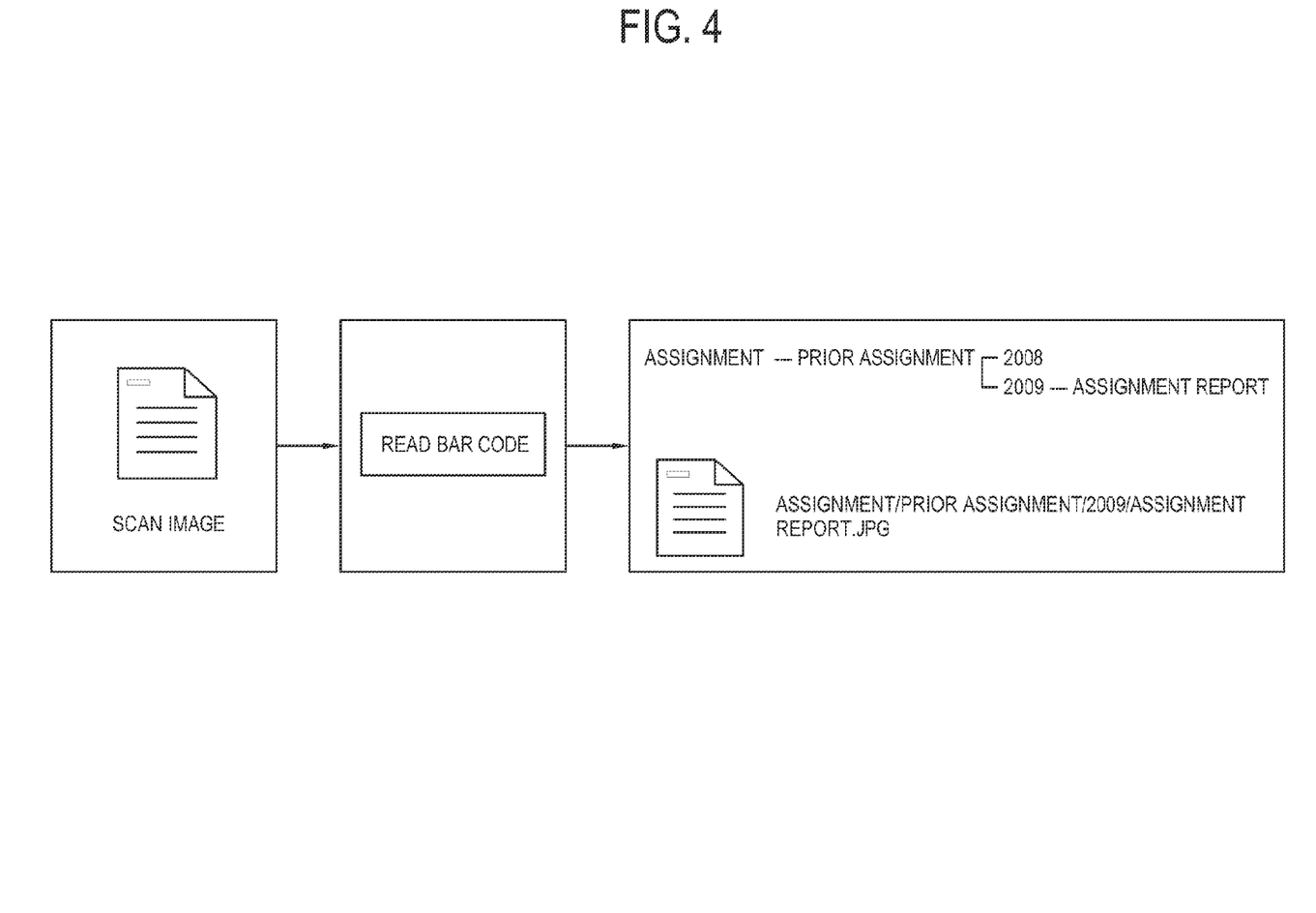
FIG. 4 illustrates scanning and storing processes of a document according to exemplary embodiments of the present general inventive concept.

FIG. 4 illustrates document scanning and storing processes according to exemplary embodiments of the present general inventive concept.

As illustrated therein, the controller 170 can read bar code information of a scanned image that can be scanned by the image scanner 110, and can select a file name of the scanned image according to the read bar code information to store the scanned image.

Figure 5:
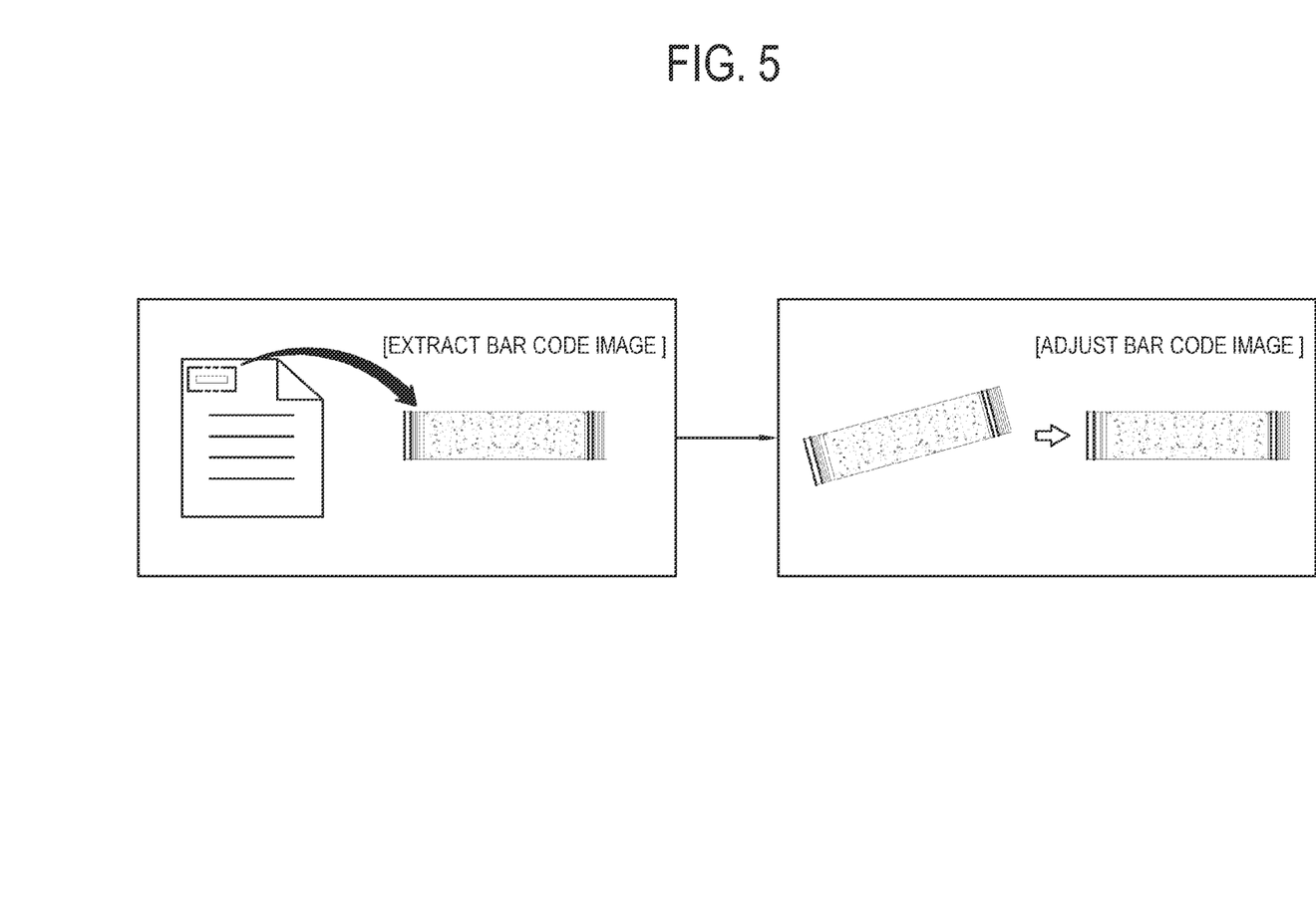
FIGS. 5 and 6 illustrate a bar code information reading process according to exemplary embodiments of the present general inventive concept.
Figure 6:
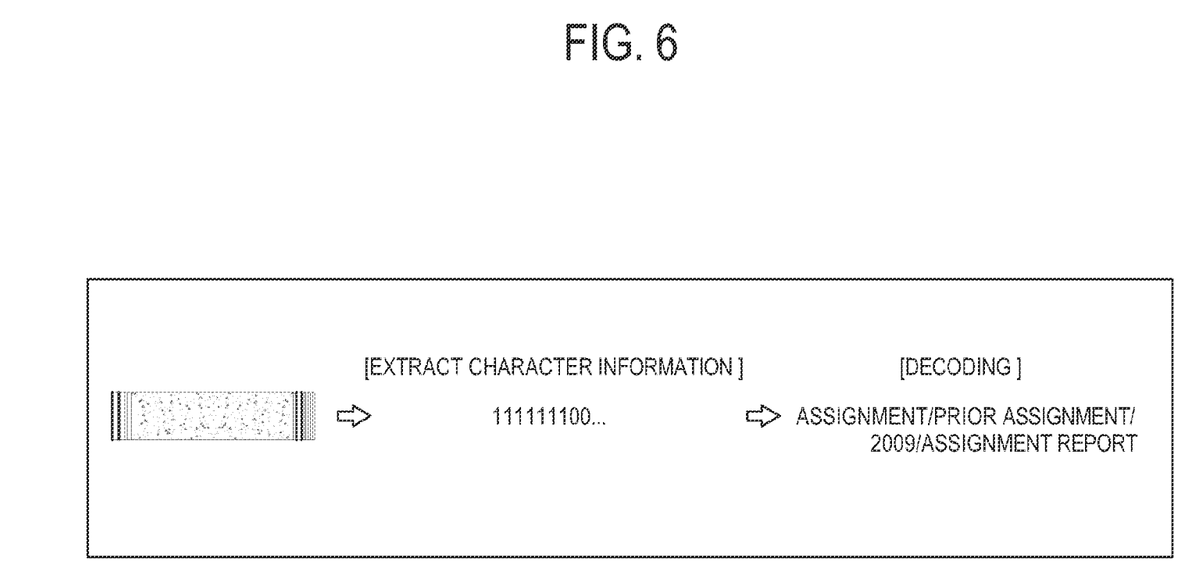

FIGS. 5 and 6 illustrate a bar code information reading process according to exemplary embodiments of the present general inventive concept.

As illustrated in FIG. 5, the controller 170 may search a location corresponding to a bar code area (e.g., upper left side) of the scanned image to read the bar code information, extract the bar code image and adjust the extracted bar code image. The adjustment can be a supplementary operation for an easier recognition of the bar code information. The adjustment may include a pretreatment process.

More specifically, the controller 170 can determine a rectangular bar code area from the generated scanned image and extracts a bar code image. FIG. 5 illustrates a bar code which is provided in an upper left side of the document, but the location of the bar code according to the present general inventive concept is not limited thereto.

The controller 170 can binarize, and can perform a deskewing and a smoothing process on the extracted bar code image to increase recognition of the bar code. The controller 170 may perform at least one of the binarization, the deskewing process and the smoothing process on the extracted bar code image as an adjustment process. The deskewing process may include color/mono deskew.

The controller 170 can extract character information of the adjusted scanned image as illustrated in FIG. 6, can decode the extracted character information and reads the bar code information.

As illustrated in FIG. 6, the extracted bar code character information may include 1 s and 0 s. The controller 170 can decode the extracted character information by using a predetermined algorithm. The decoding module that can decode the extracted character information can correspond with an encoding module to encode the bar code, and can be stored (e.g., stored in advance) in the storage unit 150, together with the document information DB.

The controller 170 can compare the bar code character information and the document information DB of the storage unit 150 by category and can read the bar code information.

The bar code information may be read as "assignment/prior assignment/2009/assignment report" as in FIG. 6 through the comparison process with the document information DB as described above in connection with FIG. 3.

The document information DB may be included in an external device such as a host apparatus or a server connected to the image forming apparatus 100 through the communication unit 160 (e.g., at least one host device 180 communicatively coupled to the communication unit 160 directly or via the network 175, or from the host device 182). If the document information DB is included in the external device, the controller 170 may load the document information list from the outside (e.g., from the host device 180 and/or the host device and compare the list with the read bar code information.

With the read bar code information, the controller 170 can set a file name to store the scanned image as in FIG. 4, and can store the scanned image in a directory designated as the file name. The designated directory may correspond to the read bar code information.

The controller 170 may generate at least one directory corresponding to a category categorized according to the read bar code information, and may store the scanned image in the generated directory.

For example, if the read bar code information is "assignment/prior assignment/2009/assignment report" as in FIG. 4, the controller 170 may sequentially generate directories corresponding to assignment, prior assignment and 2009, and may set a file name "assignment report.jpg" in the directory 2009 which has been generated, to thereby store the scanned image therein.

The file name may include information of the generated directory. That is, the controller 170 may set the file name "assignment_prior assignment_2009_assignment report.jpg" for the scanned image and store the image in the directory 2009.

The controller 170 may generate a directory "assignment report," as well as the directories "assignment", "prior assignment" and "2009" to store the scanned image in the directory "assignment report".

If the bar code of the document is 1-D bar code, the controller 170 may perform an optical character recognition (OCR) with respect to the scanned image to extract key words as character information of a document.

That is, the 1-D bar code can have a limited information volume in the same space as a 2-D bar code. Thus, the information which may be recognized by only 1-D bar code may be insufficient to generate a directory and set a file name of the scanned image.

Accordingly, the controller 170 can extract a bar code image, and can perform the OCR with respect to the scanned image if the extracted bar code image is a 1-D bar code.

The controller 170 can extract character information of the scanned documents, i.e., keywords, through the OCR, set a file name by comparing the extracted keywords with the document information DB, and can store the scanned image in the set file name in the designated directory. The designated directory can correspond to at least one of the read bar code information and the extracted character information. The controller 170 may generate a directory corresponding to at least one of the bar code information and the character information and store the scanned image in the generated directory.

Regardless of 1-D or 2-D bar code, the controller 170 may perform the OCR with respect to the 2-D bar code, set a file name with the extracted key words and store the scanned image in the generated directory if the information which is recognized by the read bar code information is insufficient to set the file name.

If the bar code of the scanned image is not readable, the controller 170 may perform the OCR, set the file name by comparing the extracted keywords and the document information DB, and store the scanned image in the generated directory.

In storing the scanned image, the controller 170 may generate a directory having at least one category in the storage unit 150 of the image forming apparatus 100, or control the communication unit 160 to transmit a directory generating command to the external device such as a server or a host apparatus (e.g., the host device 180 and/or the host device 182) and store the scanned image in the directory generated in the external device.

Since the image forming apparatus 100 according to the present general inventive concept sets a file name of a scanned document by using bar code information of a document or character information such as keywords, a user may identify the contents of the documents and systemically manage the scanned document in the directory storing the document by category.

The read bar code information or the keywords information extracted through the OCR may not be consistent with the category of the document information DB.

Then, the controller 170 sets a file name with the recognized information only, generates a corresponding category and stores the scanned image in the category.

For example, the read bar code information is "assignment/prior assignment" and the keywords information is not recognized, even though the OCR may have been performed. Then, the controller 170 may sequentially generate a directory corresponding to the assignment and at least one prior assignment, set the file name "assignment_prior assignment.pdf" in the directory "prior assignment", which has been generated, and store the scanned image in the directory.

Information which corresponds to the read bar code information or the keywords information extracted through the OCR may not exist in the document information DB. The controller 170 may select a file name by using the read bar code information or the character information through the OCR, and may store the scanned image in the designated directory.

A user may identify the contents of the document through the file name of the stored scanned image, move the storage location to the directory or amend the file name.

The controller 170 may search a document similar to the scanned document by using at least one of the bar code information and the extracted keywords, and control the display unit 140 to display thereon the search result as, for example, a list.

The controller 170 may search the document that is stored and/or prestored in the storage unit 150, or search similar documents on the web (e.g., documents that may stored in one or more host devices 180 coupled to the network 175) by using a network communication module such as the communication unit 160.

Hereinafter, a document management process of the image forming apparatus 100 with the foregoing configuration will be described with reference to FIGS. 7 to 9.

Figure 7:
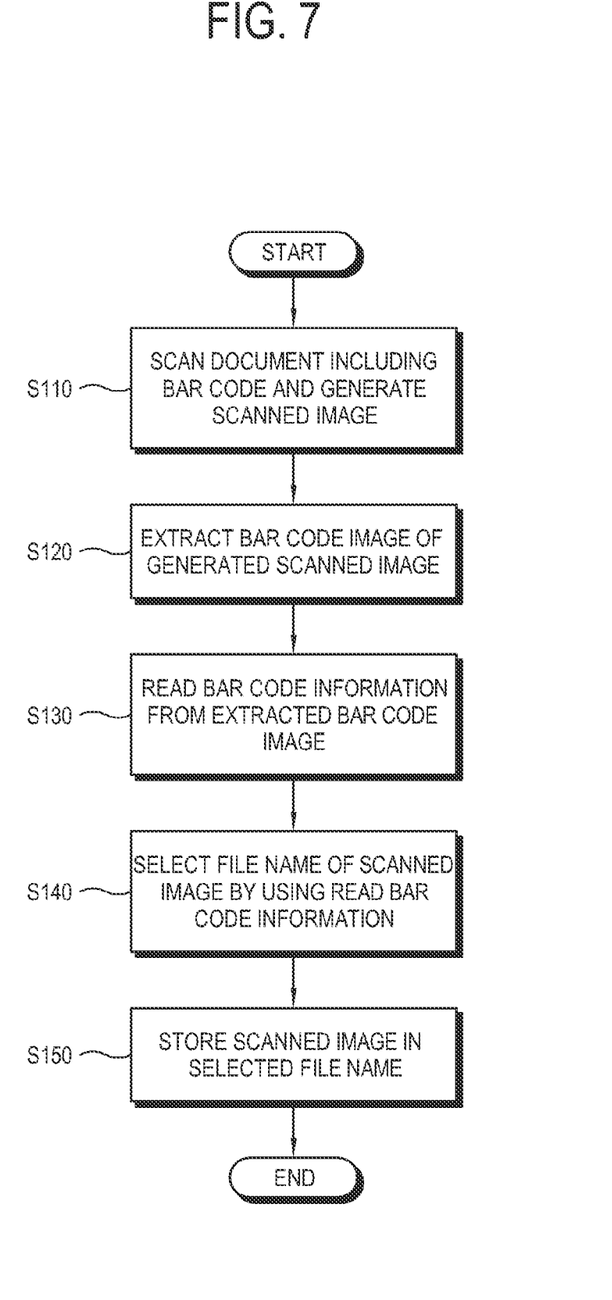
FIG. 7 is a flowchart illustrating a document management method according to exemplary embodiments of the present general inventive concept.

FIG. 7 is a flowchart which illustrates a document management method according to the exemplary embodiment of the present general inventive concept.

As illustrated therein, the image forming apparatus 100 may scan a document including the bar code corresponding to a user's scanning command and generate a scanned image at operation S110. The bar code may include a multidimensional bar code which is at least 2-D.

The controller 170 can extract the bar code image corresponding to the bar code area of the generated scanned image at operation S120. The controller 170 may perform at least one of the binarization, the deskewing process and the smoothing process described in detail above to adjust the bar code image.

The controller 170 can read the bar code information from the extracted bar code image at operation S130. The controller 170 may extract the character information from the adjusted bar code image and decode the extracted character information to read the bar code information.

The controller 170 can select a file name of the scanned image by using the read bar code information at operation S140. The controller 170 may compare the read bar code information with the document information DB that may, for example, be prestored in the storage unit 150, and may select the file name according to the comparison result. The document information DB may include file name information categorized by at least one category.

The controller 170 can store the scanned image in the selected file name at operation S150. The controller 170 may generate at least one directory corresponding to the category in the document information DB according to the comparison result at operation S140, and store the scanned image in the generated directory. The file name at operation S140 may include the generated directory information.

Figure 8:
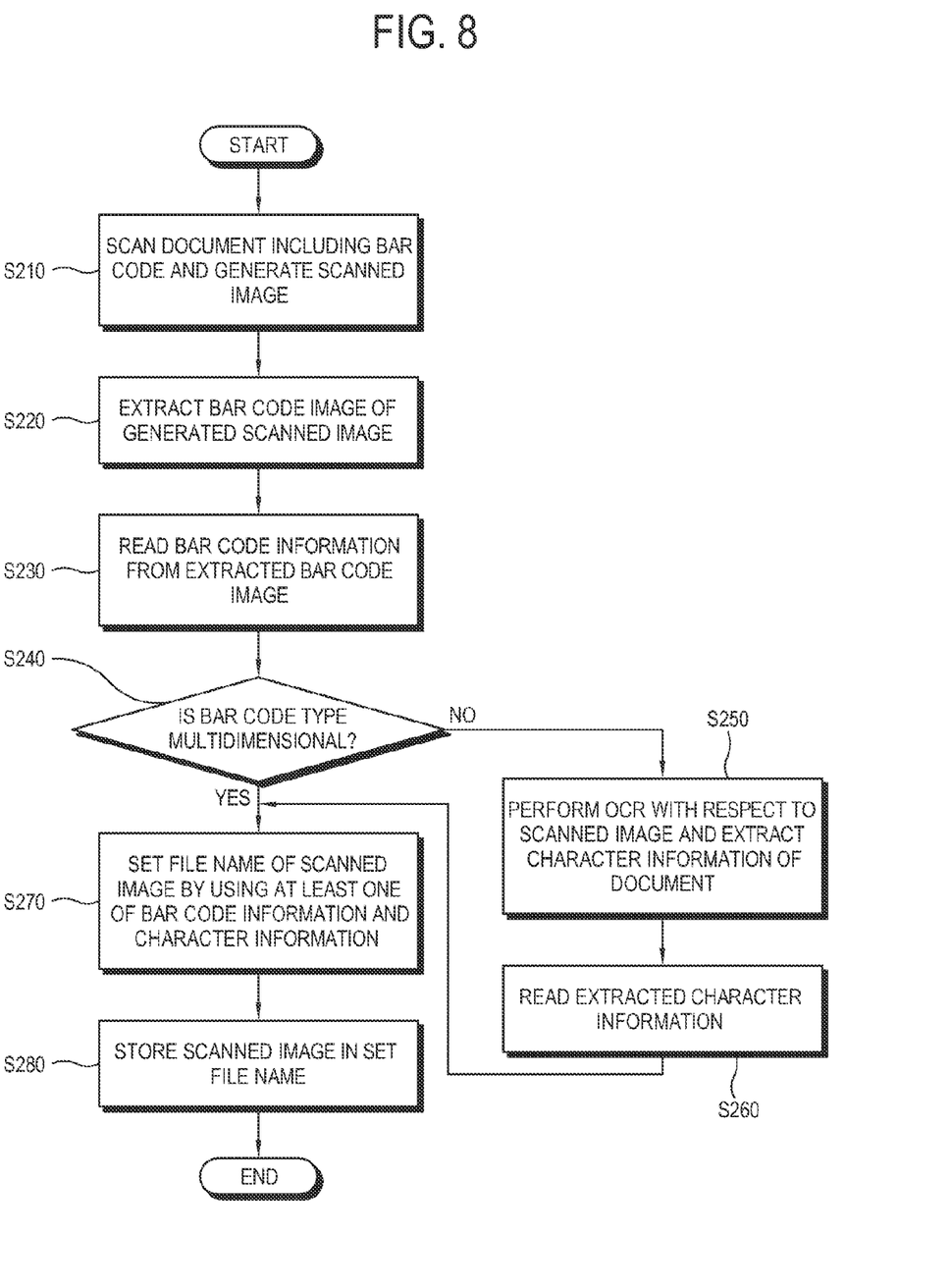
FIG. 8 is a flowchart illustrating a document management method according to exemplary embodiments of the present general inventive concept.

FIG. 8 is a flowchart which illustrates a document management method according to exemplary embodiments of the present general inventive concept.

As illustrated therein, the image forming apparatus 100 may scan a document including a bar code corresponding to a user's scanning command, and may generate a scanned image at operation S210. The bar code includes a 1-D bar code and a multidimensional bar code which is at least 2-D.

The controller 170 can extract a bar code image corresponding to a bar code area of the generated scanned image at operation S220. The controller 170 may perform at least one of the binarization, the deskewing image, and the smoothing process with respect to the extracted bar code image, and may adjust the bar code image.

The controller 170 can read the bar code information from the extracted bar code image at operation S230. The controller 170 may extract the character information from the adjusted bar code image, and read the bar code information by decoding the extracted character information.

The controller 170 may determine whether the bar code extracted at operation S220 includes a multidimensional bar code at operation S240. The controller 170 can determine whether the bar code includes a 1-D bar code or a 2-D bar code, where the operation S230 can be a process of determining whether to perform the OCR with respect to the scanned image.

The controller 170 can select the file name of the scanned image by using the read bar code information at operation S270. The controller 170 may compare the read bar code information with the document information dB that may be stored and/or prestored in the storage unit 150, and may select the file name according to the comparison result. The document information DB may include file name information categorized by at least one category.

If it is determined that the bar code of the scanned document is a 1-D bar code, not a multidimensional bar code, the controller 170 can perform the OCR with respect to the generated scanned image and can extract the keywords as character information of the scanned document at operation S250.

The controller 170 can read the extracted character information at operation S260.

At operation S270, the controller 170 may set the file name of the scanned image by using at least one of the bar code information read at operation S230 and the character information read at operation S260. The controller 170 may compare the bar code information read at operation S230 or the character information read at operation S260 with the document information DB prestored in the storage unit 150, and set the file name according to the comparison result. The document information DB may include file name information categorized by at least one category.

At operation S280, the controller 170 can store the scanned image in the file name set at operation S270, in the designated directory. The controller 170 may generate at least one directory corresponding to the category of the document information DB according to the comparison result at operation S270, and may store the scanned image in the generated directory. The file name at operation S270 may include generated directory information.

FIG. 8 illustrates the OCR with respect to the scanned image which is performed according to the type of the bar code, i.e., the 1-D bar code or the multidimensional bar code. The image forming apparatus 100 may determine whether the read bar code information includes information necessary for setting the file name, and perform the OCR if the bar code information is insufficient according to the determination result.

Figure 9:
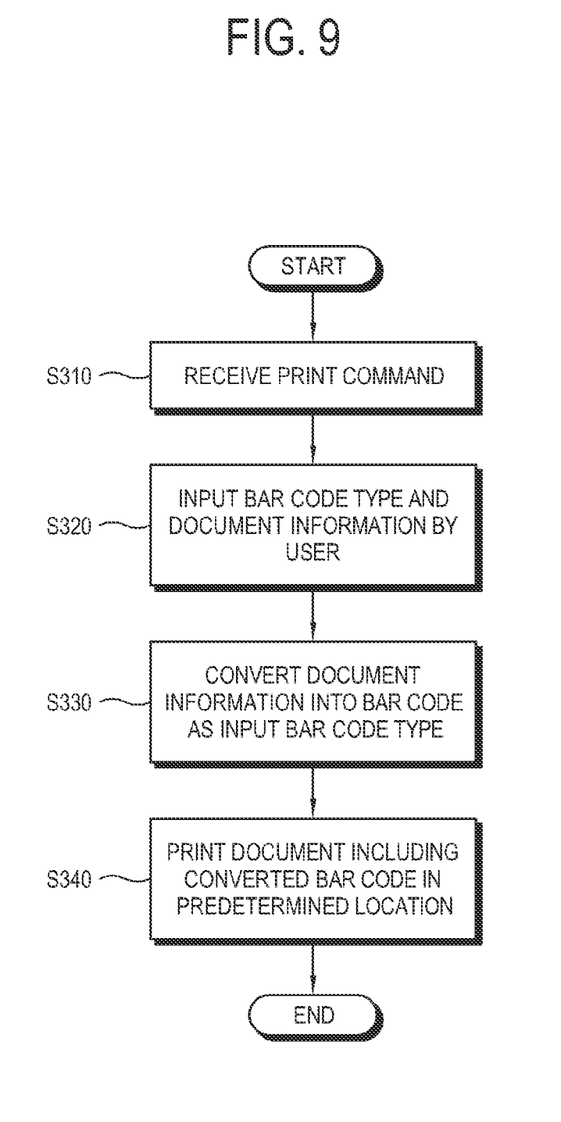
FIG. 9 is a flowchart illustrating a print process of a document including a bar code according to exemplary embodiments of the present general inventive concept.

FIG. 9 is a flowchart which illustrates a print process of a document including a bar code according to exemplary embodiments of the present general inventive concept.

As illustrated therein, the image forming apparatus 100 may receive a command to print the print data through the user input unit 130 or the host apparatus connected through the communication unit 160 at operation S310.

A user may input the bar code type and the document information of the print document according to the print command at operation S320. The controller 170 may generate a UI for a user to input the bar code type and the document information, and display the UI on the display unit 140.

The controller 170 can convert the input document information into the bar code, i.e., encode the document information at operation S330.

The controller 170 can print the document including the converted bar code in a predetermined location at operation S340.

The document which is printed at operation S340 may have a file name set by the bar code information when the scanning operation is performed at operation S110 or S210.

The image forming apparatus 100 according to the present general inventive concept may set the file name of the scanned document by using the bar code information or the keywords information of the document. Thus, a user may identify the document without an additional input of a file name or an amendment. The image forming apparatus 100 can generate a directory corresponding to a category categorized by a predetermined standard and can automatically store scanned documents in the generated directory to thereby provide convenience in managing documents.

As described above, an image forming apparatus and a document management method thereof according to the present general inventive concept can set a file name of a scanned document by using bar code information or character information such as keywords of a document such that a user can identify the document without an additional input of a file name or an amendment.

Also, the image forming apparatus and the document management method according to the present general inventive concept generates a directory corresponding to a category categorized by a predetermined standard and stores scanned documents in the generated directory to thereby provide convenience in managing the documents.

Although several exemplary embodiments of the present general inventive concept have been illustrated and described, it will be appreciated by those skilled in the art that changes may be made in these exemplary embodiments without departing from the principles and spirit of the general inventive concept, the scope of which is defined in the appended claims and their equivalents.

What is claimed is:

1. A document management method of an image forming apparatus having an image scanner to scan a document and generate a scanned image, the method comprising:
   generating the scanned image by scanning a document having a bar code;
   determining whether to perform an optical character recognition (OCR) on the scanned image by using bar code information of the generated scanned image;
   extracting character information of the document by performing the OCR on the scanned image according to the determination result;
   setting a file name of the scanned image using the bar code information and/or the extracted character information;
   generating a plurality of directories corresponding to a plurality of categories using the bar code information and/or the extracted character information, the plurality of categories being classified according to predetermined levels; and
   storing the scanned image in one of the generated categories as the set file name including information of the generated plurality of directories.

2. The method according to claim 1, wherein the determining whether to perform the OCR comprises:
   determining whether the bar code comprises a 1-D bar code or a 2-D barcode; and
   performing the OCR when the bar code comprises a 1-D bar code according to the determination result.

3. The method according to claim 1, wherein the determining whether to perform the OCR comprises:
   reading the bar code information;
   determining whether the read bar code information includes information to set the file name; and
   performing the OCR when the bar code information is insufficient according to the determination result.

4. The method according to claim 1, wherein the storing the scanned image comprises:
   storing the scanned image in a designated directory of the plurality of directories.

5. The method according to claim 1, further comprising:
   comparing the bar code information and/or the extracted character information with document information database (DB),
   wherein the setting the file name comprises setting the file name according to the comparison result.

6. The method according to claim 5, wherein the document information DB includes file name information categorized by the plurality of categories classified according to predetermined levels.

7. The method according to claim 1, further comprising:
   extracting a bar code image of the generated scanned image; and
   adjusting the bar code image by performing at least one of a binarization, a deskewing process and a smoothing process on the extracted bar code image.

8. The method according to claim 7, further comprising:
   extracting character information from the adjusted bar code image; and
   reading the bar code image by decoding the extracted character information.

9. The method according to claim 1, further comprising:
   searching for a document similar to the scanned document by using at least one of the bar code information and the extracted character information, and
   displaying the search result.

10. An image forming apparatus, comprising:
    an image scanner to scan a document comprising a bar code and to generate the scanned image;
    a storage unit to store therein the scanned image; and
    a controller to determine whether to perform an optical character recognition (OCR) on the scanned image by using bar code information of the generated scanned image, to extract character information of the document by performing the OCR on the scanned image according to the determination result, to set a file name of the scanned image by using the bar code information and/or the extracted character information, to generate a plurality of directories corresponding to a plurality of categories using the bar code information and/or the extracted character information, the plurality of categories being classified according to predetermined levels, and to store the scanned image in one of the generated categories as the set file name including information of the generated plurality of directories of the storage unit.

11. The image forming apparatus according to claim 10, wherein the controller determines whether the bar code includes a 1-D bar code or a multidimensional bar code, and performs the OCR when the bar code the 1-D bar code according to the determination result.

12. The image forming apparatus according to claim 10, wherein the controller reads the bar code information to determine whether the read bar code information includes information to set the file name, and performs the OCR when the bar code information is not sufficient according to the determination result.

13. The image forming apparatus according to claim 10, wherein the controller stores the scanned image in a designated directory of the plurality of directories.

14. The image forming apparatus according to claim 10, wherein the storage unit comprises a document information database (DB) to store the bar code information and/or the extracted character information, and the controller compares the bar code information and/or the extracted character information with the document information DB and sets the file name according to the comparison result, and the document information DB includes file name information categorized by the plurality of categories classified according to predetermined levels.

15. The image forming apparatus according to claim 10, wherein the controller extracts a bar code image of the generated scanned image, adjusts the bar code image by performing at least one of a binarization, a deskewing process and a smoothing process on the extracted bar code image, extracts character information from the adjusted bar code image and reads the bar code information by decoding the extracted character information.

16. The image forming apparatus according to claim 10, further comprising:

a display unit, wherein the controller searches a document similar to the scanned document by using at least one of the bar code information and the extracted character information, and controls the display unit to display thereon the search result.

17. A method of managing documents, the method comprising:

scanning a document having a bar code with an image forming apparatus;

extracting character information of the scanned document with the image forming apparatus;

generating a file name of the scanned image with at least one of information of the scanned bar code and/or the extracted character information;

generating a plurality of directories corresponding to a plurality of categories using the bar code information and/or the extracted character information, the plurality of categories being classified according to predetermined levels; and storing the scanned image in one of the generated categories as the generated file name including information of the generated plurality of directories in a storage unit.

18. The method of claim 17, wherein the storing the scanned image comprises:

storing the scanned document according to a category of a document information database.

* * * * *